United States Patent [19]

Nose et al.

[11] Patent Number: 5,329,513

[45] Date of Patent: Jul. 12, 1994

[54] ANGULAR RELATIONSHIP DETECTION DEVICE AND METHOD

[75] Inventors: Hiroyasu Nose, Zama; Toshihiko Miyazaki, Hiratsuka; Kunihiro Sakai, Isehara; Toshimitsu Kawase; Takahiro Oguchi, both of Atsugi, all of Japan

[73] Assignee: Canon Kabushiki Kaisha, Tokyo, Japan

[21] Appl. No.: 766,094

[22] Filed: Sep. 27, 1991

[30] Foreign Application Priority Data

Oct. 4, 1990 [JP] Japan ................... 2-265086

[51] Int. Cl.$^5$ ............................................. G11B 9/00
[52] U.S. Cl. ................... 369/126; 250/306; 365/151; 369/43; 369/57; 369/130
[58] Field of Search ................... 369/43, 57, 126, 127, 369/130; 250/306; 365/151

[56] References Cited

U.S. PATENT DOCUMENTS

| | | | |
|---|---|---|---|
| 4,962,480 | 10/1990 | Ooumi et al. | 250/306 |
| 5,132,533 | 7/1992 | Kawase et al. | 250/306 |
| 5,144,581 | 9/1992 | Toda et al. | 369/126 |
| 5,150,035 | 9/1992 | Nose et al. | 250/306 |
| 5,155,359 | 10/1992 | Monahan | 250/306 |
| 5,187,367 | 2/1993 | Miyazaki et al. | 369/126 |

FOREIGN PATENT DOCUMENTS

| | | |
|---|---|---|
| 63-171553 | 7/1988 | Japan. |
| 0135743 | 2/1989 | Japan. |
| 01147317 | 6/1989 | Japan. |
| 01147318 | 6/1989 | Japan. |
| 01150813 | 6/1989 | Japan. |

OTHER PUBLICATIONS

"*Fast Type Scanning Tunneling Microscope*"; Kotai Butsuri, Solid State Physics, vol. 22, No. 3, 1987, pp. 176–186.

*Primary Examiner*—Joseph E. Clawson, Jr.
*Attorney, Agent, or Firm*—Fitzpatrick, Cella, Harper & Scinto

[57] ABSTRACT

An encoder or an information reading device detects a scale with a probe that is vibrated at a predetermined frequency and amplitude in a predetermined direction. The angular positional relationship between the direction of probe vibration and the scale is detected according to frequency spectrum information of a detection signal obtained by detecting the scale with the vibrating probe.

31 Claims, 4 Drawing Sheets

FIG. I (A)
PRIOR ART
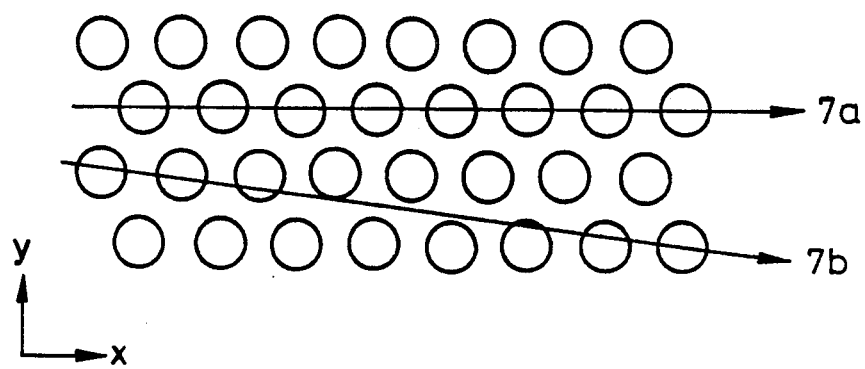
FIG. I (B)
PRIOR ART
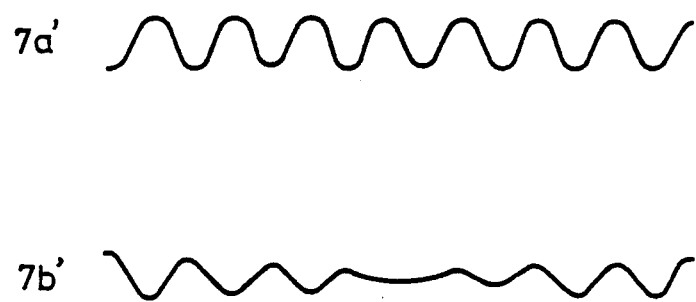

3A-3A' CROSS SECTION

ANGULAR RELATIONSHIP DETECTION DEVICE AND METHOD

BACKGROUND OF THE INVENTION

1. Field of the Invention

This invention relates to angular relationship and information detection in precision positioning, speed and displacement measurement, and the like. In particular, the present invention is applicable to an angular detection method necessary for information reading apparatus.

2. Description of the Related Art

A conventional encoder of this kind comprises a reference scale that includes information relating to positions or angles, and detection means for detecting information relating to positions or angles while performing relative movement with respect to the reference scale. Such encoders are classified into several types according to the reference scale and the detection means; for example, optical encoders, magnetic encoders, capacitance-type encoders and the like.

As an encoder having higher resolution, an encoder which uses an atomic arrangement as the reference scale utilizing the principle of a scanning tunnel microscope (STM) has been proposed (Japanese Patent Application Public Disclosure (Kokai) No. 62-209302 (1987)).

The scanning tunnel microscope utilizes the phenomenon that a tunnel current flows when the distance between a conductive sample and a conductive probe is reduced to about 1 nm while a voltage is applied between them. The tunnel current exponentially changes in accordance with the distance. That is, if the surface of a sample made of a conductive substance is scanned in two dimensions by a pointed probe while maintaining the distance between the probe and the surface of the sample constant, the tunnel current changes in accordance with the atomic arrangement or the shape of projections and recesses of the surface, whereby an image of the surface of the sample can be obtained (Kotai Butsuri (Solid-State Physics), Vol. 22, No. 3, 1987, pp. 176–186).

That is, by using a sample having a regular atomic arrangement or the shape of periodic projections and recesses as a reference scale, and utilizing the phenomenon that if a relative displacement along the direction of the reference scale is produced between the reference scale and the probe, the tunnel current periodically changes in accordance with the displacement, it is possible to provide an encoder having an atomic-order resolution of about a few Å.

In the above-described conventional encoder, a crystal lattice of, for example, graphite (HOPG or kish graphite) may be used as the reference scale. The actual STM image of graphite has the shape of a triangle lattice, as shown in FIG. 1(A). Hence, the detected tunnel current changes between waveforms 7a' and 7b' shown in FIG. 1(B) in accordance with the locus of the moving probe (between arrows 7a and 7b in FIG. 1(A)). For example, if the locus of the probe rides on peaks of the crystal lattice, as represented by arrow 7a, a uniform output signal having a large amplitude and an excellent S/N ratio, as represented by waveform 7a', is obtained. On the other hand, if the locus of the probe is inclined with respect to the direction of alignment of the crystal lattice, as represented by arrow 7b, the amplitude of the output signal is large when the locus rides on a peak of the crystal lattice, but is small when the locus crosses a valley of the crystal lattice, as represented by waveform 7b'. Hence, a uniform output signal cannot be obtained, causing errors in the output of the encoder.

When the encoder having the above-described configuration is used, it is desirable that the probe passes along the locus shown by arrow 7a. Actually, however, when a reference scale using a crystal lattice or the like is set in an encoder, it is impossible to visually confirm the crystal orientation. Accordingly, the orientation of the crystal lattice is in most cases inclined with respect to the direction of detection of the amount of movement, causing detection errors.

SUMMARY OF THE INVENTION

It is an object of the present invention to provide a device and method which can easily and securely measure an angular relationship between the direction of alignment of information and the direction of detection of information in information detection as described above.

It is another object of the present invention to remove detection errors due to inclination of the direction of detection of the amount of movement in an encoder or the like, in consideration of the above-described problems in the prior art.

The invention is directed to determining an angular relationship between a probe and an information arrangement in at least one direction on a surface in which the probe is vibrated in a predetermined direction along the surface. The angular relationship between the probe vibration direction and the information arrangement direction is detected according to frequency information from the vibrating probe.

These and other objects and features of the present invention will become more apparent from the following detailed description of the preferred embodiments taken in connection with the accompanying drawings.

BRIEF DESCRIPTION OF THE DRAWINGS

FIGS. 1(A) and 1(B) are diagrams illustrating a conventional approach;

DETAILED DESCRIPTION OF THE PREFERRED EMBODIMENTS

An embodiment of the present invention will now be explained with reference to the drawings.

Figure 2:
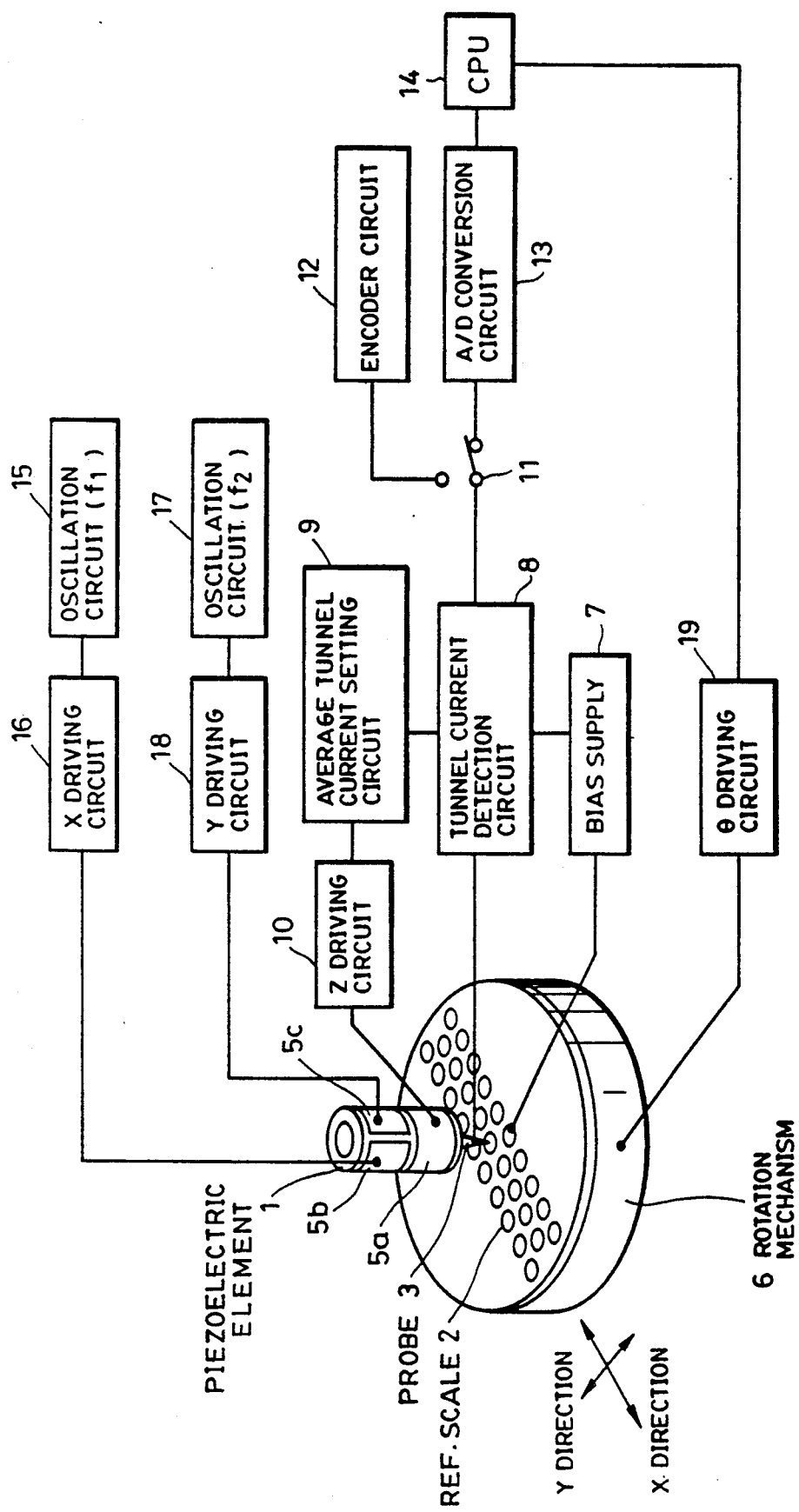
FIG. 2 is a diagram showing the configuration of an encoder according to an embodiment of the present invention.
Figure 3:
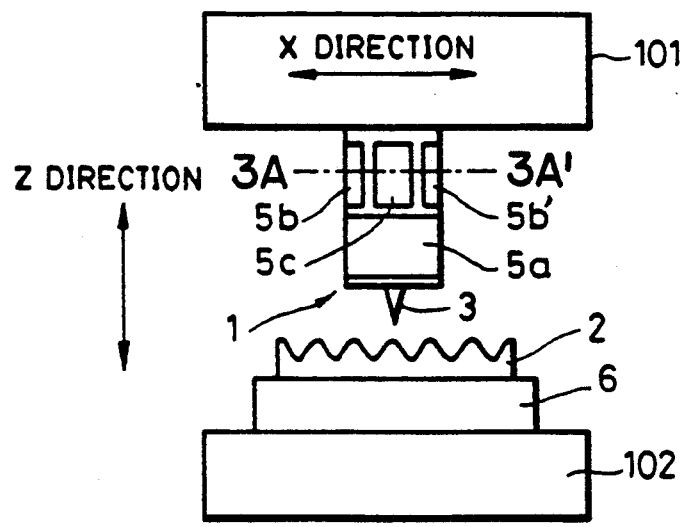
FIGS. 3(a) and 3(b) are diagrams illustrating the operation of the device shown in FIG. 2.
Figure 3:
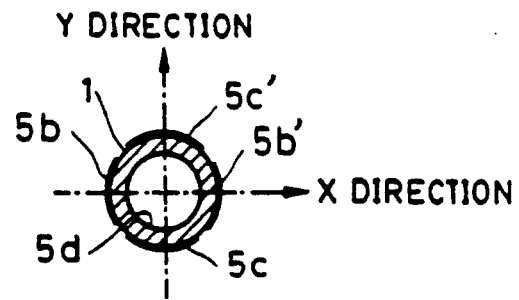

FIG. 2 is a diagram showing the configuration of an encoder according to an embodiment of the present invention. FIGS. 3(a) and 3(b) are diagrams illustrating the operation of the encoder.

In FIG. 2, a cylindrical piezoelectric element 1 drives a probe 3. A reference scale 2 comprises a crystal lattice of, for example, graphite or the like. The probe 3 is fixed at a distal end of the cylindrical piezoelectric element 1, and is disposed so as to be able to perform a relative movement with respect to the reference scale 2 in the direction of detecting the amount of relative movement (the x direction). That is, as shown in FIG. 3(a), an object 101 on which the cylindrical piezoelectric element 1 is fixed, and an object 102 on which the reference scale 2 is fixed via a rotation mechanism 6 are supported so as to be mutually movable in the direction of detecting the amount of relative movement (the x direction). The amount of relative movement between the object 101 and the object 102 is detected from the amount of relative movement between the probe 3 and the reference scale 2. Although not illustrated, a pulse motor may be used as the rotation mechanism 6. Alternatively, a deceleration mechanism using worm gears or the like may be provided as the rotation mechanism 6.

Electrodes 5a, 5b, 5b', 5c and 5c' having the pattern shown in FIGS. 3(a) and 3(b) are formed on the outer circumference of the cylindrical piezoelectric element 1, and a uniform common electrode 5d is formed on the inner circumference of the cylindrical piezoelectric element 1, as shown in FIG. 3(b). If a z driving circuit 10 applies a voltage to the electrode 5a, the cylindrical piezoelectric element 1 expands and contracts in the z direction in FIG. 3(a), whereby the distance between the probe 3 and the reference scale 2 can be adjusted. If an x driving circuit 16 applies voltages having opposite polarities to the electrodes 5b and 5b', one of the electrodes 5b and 5b' expands in the z direction and the other electrode contracts in the z direction, whereby the cylindrical piezoelectric element 1 is deflected in the x direction, whereby the probe 3 is driven in the x direction. Similarly, if a y driving circuit 18 applies voltages to the electrodes 5c and 5c', the probe 3 is driven in the y direction.

Referring again to FIG. 2, a bias supply 7 applies a bias voltage between the probe 3 and the reference scale 2, and the probe 3 is brought close to the reference scale 2 so that a tunnel current flows between the distal end of the probe 3 and the reference scale 2. The tunnel current is detected by a tunnel current detection circuit 8. An average interval between the probe 3 and the reference scale 2 is controlled to be constant according to the output of the tunnel current detection circuit 8 even during relative movement and angle adjustment (to be described later). That is, a tunnel current setting circuit 9 sets a predetermined value of the tunnel current so that the probe 3 and the reference scale 2 are separated by a desired interval, and detects an error signal representing the difference between the set value and the output of the tunnel current detection circuit 8.

A low-pass filter provided in the tunnel current setting circuit 9 averages the error signals, and the tunnel current setting circuit 9 applies a control voltage to the electrode 5a of the cylindrical piezoelectric element 1 via the z driving circuit 10 so that the average of the error signals becomes zero.

During the relative movement of the probe 3 and the reference scale 2, the interval between the probe 3 and the reference scale 2 changes due to peaks of the reference scale 2, whereby a signal corresponding to the amount of movement is produced in the tunnel current. Hence, by counting the number of the peaks, it is possible to detect the amount of relative movement. During the measurement of the amount of movement, a moving-amount signal from the tunnel current detection circuit 8 is connected to an encoder circuit 12 using a change-over switch 11. The encoder circuit 12 performs signal processing in order to detect the amount of movement.

As the method of detecting the amount of movement, any of known methods described, for example, in Japanese Patent Application Public Disclosure (Kokai) Nos. 1-147317 (1989), 1-147318 (1989) and 1-150813 (1989) may be used. The present invention is not limited to any particular method.

Next, an explanation will be provided of a method of detecting angular errors with respect to the direction of detecting the amount of movement of the reference scale with reference to FIG. 2. Before measuring the amount of movement, the change-over switch 11 is connected to an A/D conversion circuit 13. Hence, the output of the tunnel current detection circuit 8 is digitized by the A/D conversion circuit 13, and is received in a CPU 14. A voltage is applied to the electrode 5b by an oscillation circuit 15 and the x driving circuit 16, whereby the probe 3 performs stationary vibration in the x direction in the form of a triangular wave having a frequency $f_1$ and an amplitude $d_1$. The amplitude $d_1$ has a value so that the probe 3 scans a plurality of, for example, 10 peaks of the reference scale 2. A voltage is applied to the electrode 5c by an oscillation circuit 17 and the y driving circuit 18. The probe 3 then performs stationary vibration in the y direction in the form of a triangular wave having a frequency $f_2$ and an amplitude $d_2$. The frequency $f_2$ in the y direction is set to a considerably smaller value than the frequency $f_1$ in the x direction. For example, if $f_1 = 100$ Hz–1 kHz, $f_2$ is set to about $f_2 = 1$–10 Hz. The amplitude $d_2$ is set to a value so that the probe 3 scans at least one row of peaks when the reference scale 2 comprises a crystal lattice of, for example, graphite.

Figure 4:
FIG. 4 is a diagram illustrating a detection signal in the device shown in FIG. 2.

In such a case, as shown in FIG. 4, if the probe 3 moves over peaks of the reference scale 2, a signal of frequency $f = 2d_1 f_1 / p$ appears at the output of the tunnel current detection circuit 8 due to scanning in the x direction, where p (a constant) represents the pitch of peaks of the reference scale 2. The amplitude of the signal is reduced if the probe 3 deviates from the peaks. At that time, since the probe 3 simultaneously performs scanning in the y direction, the probe 3 necessarily crosses peaks of the reference scale 2 and periodically issues signals. Hence, a signal is always present. The signal is received in the CPU 14 via the A/D conversion circuit 13, and an angular error is detected in the following manner.

That is, such signals are received during a certain time period and are subjected to a Fourier transformation, and the spectrum of the signal having the frequency $f = 2d_1 f_1 / p$ for peaks of the reference scale 2 corresponding to the scanning frequency $f_1$ in the x direction is obtained.

Figure 5A:
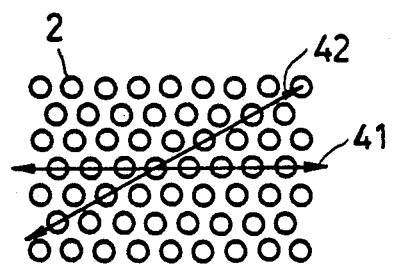
FIGS. 5(a)–5(f) illustrate the patterns of reference scales which can be applied to the device shown in FIG. 2, and signals obtained from the reference scales.

FIG. 5(a) illustrates a pattern of peaks of the reference scale 2. A crystal lattice of, for example, graphite has the shape of such a triangular lattice. In FIG. 5(a), arrow 41 represents the scanning direction when the scanning (the direction of detecting the amount of relative movement) in the x direction coincides with the direction of the reference scale 2. Arrow 42 represents the scanning direction (the direction of detecting the amount of relative movement) when the angle of the reference scale 2 deviates from the scanning direction in the x direction. Since FIG. 5(a) is illustrated based on the pattern of the reference scale 2, it appears that the scanning in the x direction changes.

Figure 5B:
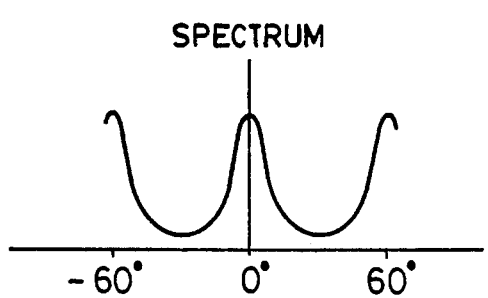

If the reference scale 2 having such a pattern is rotated making the direction of arrow 41 0°, the intensity of the spectrum of the signal having the frequency $f=2d_1f_1/p$ changes as shown in FIG. 5(b). That is, the intensity of the spectrum of the signal having the frequency $f=2d_1f_1/p$ has a maximum value when the direction of the reference scale 2 coincides with the scanning (the direction of detecting the amount of relative movement) in the x direction. The intensity of the spectrum first decreases as the angle between the two directions increases, then increases, and again has the maximum value at a symmetrical position of the pattern. In the case of the pattern shown in FIG. 5(a), the intensity of the spectrum has a peak value at every rotation of 60°. Accordingly, by rotating the reference scale 2, an angle where the spectrum of the signal having the frequency $f=2d_1f_1/p$ has the maximum value can be detected. Hence, it is possible to make the direction of the reference scale 2 coincide with the scanning direction, that is, the direction of detecting the amount of relative movement in the x direction. That is, it is possible to make the direction of the reference scale 2 coincide with the direction of detecting the amount of relative movement by driving the rotation mechanism 6 of the reference scale 2 with a $\theta$ driving circuit 19 in accordance with a signal from the CPU 14, performing a Fourier transform calculation while monitoring the tunnel-current signal at that time in the CPU 14 via the A/D conversion circuit 13, detecting an angle where the spectrum of the signal having the reference frequency f has a maximum value, and controlling the rotation mechanism 6 to have that angle. It is also possible to quantitatively detect an angular error in an originally deviated state from a rotated angle of the reference scale 2 until the spectrum of the signal having the reference frequency f has the maximum value.

Figure 5C:
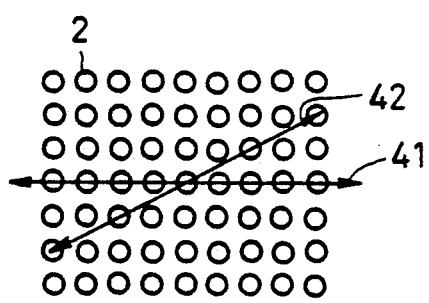
Figure 5D:
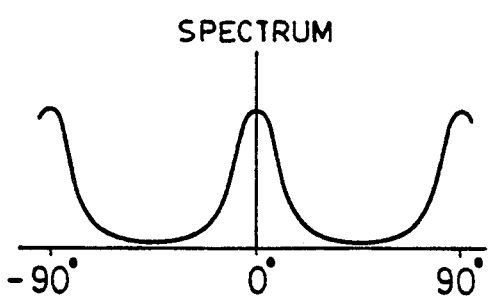
Figure 5E:
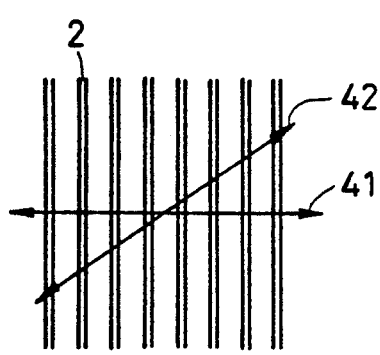
Figure 5F:
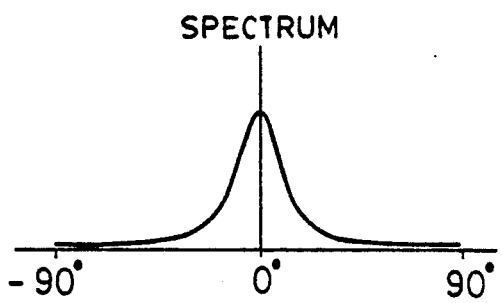

When the pattern of the reference scale 2 is square as shown in FIG. 5(c), the spectrum of the signal having the reference frequency $f=2d_1f_1/p$ has a peak at every 90°, as shown in FIG. 5(d). When the pattern of the reference scale 2 comprises lines as shown in FIG. 5(e), the spectrum, as shown in FIG. 5(f), has the maximum value when the scanning direction in the x direction is orthogonal to the line-like pattern, as represented by arrow 41. Hence, it is possible to align the direction of the reference scale 2 in the same manner as described above. In the case of using such a pattern, since a signal always has peaks corresponding to peaks of the reference scale, it is not always necessary to perform probe scanning in the y direction.

When such a line-like pattern is used, if the direction of the arrow 41 on the reference scale 2 is defined to be 0°, the pitch p of the scale in the x direction is expressed by $p/\cos\theta$, where $\theta$ represents an anguler error with respect to the direction of arrow 41. Hence, the frequency of a modulated signal originated from the scanning frequency $f_1$ in the x direction is represented by $2d_1f_1\cos\theta/p$.

Accordingly, in this case, the frequency of the modulated signal is a function of the angular error $\theta$. Hence, it is possible to obtain the angular error from the amount of deviation of the frequency of the modulated signal. That is, the angular error can be calculated by a Fourier transformation of a signal from the A/D conversion circuit 13 in the CPU 14, and obtaining the frequency where the spectrum has a maximum value.

As described above, in angular detection of the present embodiments, a scale is detected using a probe while vibrating the probe facing the scale at a predetermined frequency and a predetermined amplitude in a certain direction, and the angular positional relationship between the direction of vibration of the probe and the scale is detected according to frequency spectrum information of the detected signal.

An encoder or an information reading device for detecting a scale, serving as a first object, using a probe, serving as a second object, comprises a means for vibrating the probe at a predetermined frequency and a predetermined amplitude in a certain direction, and a means for detecting the angular positional relationship between the direction of vibration of the probe and the scale according to information of the frequency spectrum of the detected signal obtained by detecting the scale during the vibration of the probe.

When the scale has the form of lattice points, it is in general preferred to vibrate the probe at a predetermined frequency and a predetermined amplitude also in a direction orthogonal to the direction of the probe vibration, as described above. However, even if the probe is not vibrated in the orthogonal direction, the basic effects of the present invention are unimpaired.

As a signal having an amplitude that is a function of the distance between the probe and each scale, a minute force exerted between the probe and the scale may be utilized instead of the above-described tunnel current flowing between the probe and the scale.

In the encoder of the present invention described above, means for reflecting the result of the detection of the angular positional relationship between the direction of vibration of the probe and the scale, a means for adjusting the angular positional relationship between the first object and the second object according to the result of the detection may also be used.

In the present embodiments, the frequency of the scale detection signal obtained by vibrating the probe facing the scale with a predetermined frequency and a predetermined amplitude in a certain direction corresponds to the number of graduations of the scale detected by the vibrating probe during a unit time period. The number of graduations corresponds to the direction of the vibration of the probe with respect to the scale. Accordingly, the angular positional relationship between the direction of the probe vibration and the scale is detected according to the frequency of the detection signal. For example, the frequency of the signal to be detected when the direction of the scale coincides with the direction of vibration of the probe is used as a reference. The coincidence of the direction of the scale with the direction of probe vibration is detected by the fact that the intensity of the reference frequency component in the detection signal has a peak. In this case, the probe is vibrated with an amplitude greater than the lattice interval and a relatively low frequency also in a direction orthogonal to the direction of probe vibration to make the range of detection a plane. The coincidence of the direction of the scale with the direction of probe vibration is detected by the fact that the intensity of the spectrum of the reference frequency component of the detection signal at a certain time period has a peak. An exact detection of displacement is performed, for example, by reflecting the result of detection while adjusting the angle between the scale and the direction of detection of displacement using the probe so that such a coincidence is detected.

The rotation mechanism 6 is not limited to the above-described methods of rotation wherein the pulse motor or the deceleration mechanism comprising worm gears is provided, but any other well-known method may be used. Furthermore, the scale is not limited to the scale for measurement of the encoder, but a scale having graduations arranged with a certain period, for example, information bits arranged with a predetermined period within an information recording medium for an information recording/reproducing apparatus described in Japanese Patent Application Public Disclosure (Kokai) Nos. 63-161553 (1988) and 64-35743 (1989), may also be used. In such a case, the information recording/reproducing apparatus may function in the same manner as in the above-described embodiments.

As explained above, in the present embodiments, the scale is detected using the probe while vibrating the probe facing the scale at a predetermined frequency and a predetermined amplitude in a certain direction, and the angular positional relationship between the direction of vibration of the probe and the scale is detected according to the frequency spectrum information of the detection signal. Hence, it is possible to adjust the inclination of the scale with respect to the direction of detection of displacement according to the detection result.

What is claimed is:

1. A device for detecting an angular relationship between a probe for reading information and an information arrangement arranged in at least one direction within a predetermined surface, said device comprising:
   vibration means for vibrating the probe at a predetermined amplitude and a predetermined frequency in a predetermined direction along said predetermined surface; and
   angular relationship detection means for detecting an angular relationship between the direction of vibration of said probe and the direction of arrangement of said information arrangement according to frequency information of a detection signal obtained via said probe during the vibration of said probe by said vibration means.

2. A device according to claim 1, wherein said angular relationship detection means detects said angular relationship according to an intensity of a component of said detection signal having a predetermined frequency.

3. A device according to claim 2, wherein said angular relationship detection means detects that the direction of arrangement of said information arrangement coincides with the direction of vibration of said probe when the intensity of the component having the predetermined frequency of said detection signal has a maximum value.

4. A device according to claim 1, wherein said angular relationship detection means detects an angular value between the direction of arrangement of said information arrangement and the direction of vibration of said probe as said angular relationship according to the frequency of said detection signal.

5. A device according to claim 4, wherein said angular relationship detection means determines the angular value of the direction of arrangement of said information arrangement and the direction of vibration of said probe from a frequency having a maximum value in a spectrum obtained by a Fourier transformation of said detection signal.

6. A device according to claim 1, wherein said vibration means also vibrates said probe at a predetermined frequency and a predetermined amplitude in a direction perpendicular to said predetermined direction.

7. A device according to claim 1, wherein said angular relationship detection means detects said angular relationship according to frequency information of said detection signal based on a current flowing between said probe and said information arrangement.

8. A device according to claim 1, wherein said angular relationship detection means detects said angular relationship according to frequency information of the detection signal based on a minute force exerted between said probe and said information arrangement.

9. A method for detecting an angular relationship between a probe for reading information and an information arrangement arranged in at least one direction within a predetermined surface, said method comprising:
   vibrating the probe at a predetermined amplitude and a predetermined frequency in a predetermined direction along said predetermined surface; and
   detecting an angular relationship between a direction of vibration of said probe and a direction of arrangement of said information arrangement, said detection being performed according to frequency information of a detection signal obtained via said probe during the vibration of said probe.

10. A method according to claim 9, wherein said angular relationship detection is performed according to an intensity of a component of said detection signal having a predetermined frequency.

11. A method according to claim 10, wherein said angular relationship detection is performed by detecting that the direction of arrangement of said information arrangement coincides with the direction of vibration of said probe when the intensity of the component having the predetermined frequency of said detection signal has a maximum value.

12. A method according to claim 9, wherein said angular relationship detection is performed by detecting an angular value between the direction of arrangement of said information arrangement and the direction of vibration of said probe as said angular relationship according to the frequency of said detection signal.

13. A method according to claim 12, wherein the angular value between the direction of arrangement of said information arrangement and the direction of vibration of said probe is determined from a frequency having a maximum value in a spectrum obtained by a Fourier transformation of said detection signal.

14. A method according to claim 9, wherein said vibration is also performed at a predetermined frequency and a predetermined amplitude in a direction perpendicular to said predetermined direction.

15. A method according to claim 9, wherein said angular relationship detection is performed according to frequency information of the detection signal based on a current flowing between said probe and said information arrangement.

16. A method according to claim 9, wherein said angular relationship detection is performed according to frequency information of the detection signal based on a minute force exerted between said probe and said information arrangement.

17. A device for detecting an angular relationship between a probe driven for reading information and an information arrangement arranged in at least one direction within a predetermined surface, said device comprising:
   a control circuit for controlling an element for driving the probe to vibrate at a predetermined amplitude and a predetermined frequency in a predetermined direction along said predetermined surface; and a processing unit for detecting an angular relationship between a direction of vibration of said probe and a direction of arrangement of said information arrangement according to frequency information of a detection signal obtained via said probe during the vibration of said probe by said control circuit.

18. A device according to claim 17, wherein said processing unit detects said angular relationship according to an intensity of a component of said detection signal having the predetermined frequency.

19. A device according to claim 18, wherein said processing unit detects that the direction of arrangement of said information arrangement coincides with the direction of vibration of said probe when the intensity of the component having the predetermined frequency of said detection signal has a maximum value.

20. A device according to claim 17, wherein said processing unit detects an angular value between the direction of arrangement of said information arrangement and the direction of vibration of said probe as said angular relationship according to the frequency of said detection signal.

21. A device according to claim 20, wherein said processing unit determines the angular value made by the direction of arrangement of said information arrangement and the direction of vibration of said probe from a frequency having a maximum value in a spectrum obtained by a Fourier transformation of said detection signal.

22. A device according to claim 17, wherein said control circuit also controls so as to vibrate said probe at a predetermined frequency and a predetermined amplitude in a direction perpendicular to said predetermined direction.

23. A device according to claim 17, wherein said processing unit detects said angular relationship according to frequency information of the detection signal based on a current flowing between said probe and said information arrangement.

24. A device according to claim 17, wherein said processing unit detects said angular relationship according to frequency information of the detection signal based on a minute force exerted between said probe and said information arrangement.

25. A device for reading information from an information arrangement arranged in at least one direction within a predetermined surface via a probe, said device comprising:

signal detection means for obtaining a detection signal via the probe, the information being read from the detection signal of said signal detection means;

vibration means for vibrating the probe at a predetermined amplitude and a predetermined frequency in a predetermined direction along said predetermined surface; and angular relationship detection means for detecting an angular relationship between the direction of vibration of said probe and the direction of arrangement of said information arrangement according to frequency information of the detection signal obtained during the vibration of said probe.

26. A device according to claim 25, wherein said signal detection means obtains the detection signal from graduations for measurement of an encoder, serving as said information arrangement.

27. A device according to claim 25, wherein said signal detection means obtains the detection signal from an information bit string, serving as said information arrangement.

28. A device according to claim 25, wherein said signal detection means detects said angular relationship according to frequency information of the detection signal based on a current flowing between said probe and said information arrangement.

29. A device according to claim 25, wherein said signal detection means detects said angular relationship according to frequency information of the detection signal based on a minute force exerted between said probe and said information arrangement.

30. A device according to claim 25, further comprising means for adjusting a direction of arrangement of said information arrangement and a direction of relative movement of said probe with respect to said information arrangement according to a result of the detection by said angular relationship detection means.

31. An encoder comprising:
a probe for reading a scale arranged within a predetermined surface;
an encoder circuit for detecting an amount of movement according to the reading of the scale by said probe;
a driving element for driving said probe;
a control circuit for controlling said driving element to vibrate said probe at a predetermined amplitude and a predetermined frequency in a predetermined direction along said predetermined surface; and
a processing unit for detecting an angular relationship between the direction of vibration of said probe and a direction of arrangement of an information arrangement on said scale according to frequency information of a detection signal obtained via said probe during the vibration of said probe by said control circuit.

* * * * *

UNITED STATES PATENT AND TRADEMARK OFFICE
CERTIFICATE OF CORRECTION

PATENT NO. : 5,329,513
DATED : July 12, 1994
INVENTOR(S) : HIROYASU NOSE, ET AL.

It is certified that error appears in the above-identified patent and that said Letters Patent is hereby corrected as shown below:

ON TITLE PAGE

In [56] References Cited, under FOREIGN PATENT DOCUMENTS:
```
"  0135743   2/1989  Japan .
   01147317  6/1989  Japan .
   01147318  6/1989  Japan .
   01150813  6/1989  Japan . "     should read -- 1-35743   2/1989  Japan .
   1-147317  6/1989  Japan .
   1-147318  6/1989  Japan .
   1-150813  6/1989  Japan . --.
```

COLUMN 7

Line 10, "64-35743 (1989)" should read --1-35743 (1989)--.

Signed and Sealed this

Tenth Day of January, 1995

Attest:

BRUCE LEHMAN

*Attesting Officer*     *Commissioner of Patents and Trademarks*